(12) United States Patent
A'Hearn et al.

(10) Patent No.: US 6,321,534 B1
(45) Date of Patent: Nov. 27, 2001

(54) RIDE CONTROL

(75) Inventors: Michael A. A'Hearn, Shorewood; Thomas J. Hajek, Jr., Lockport; Michael D. Hudson, Plainfield; Lawrence F. Schexnayder, Morris; Srikrishnan T. Tolappa, Aurora, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/348,490

(22) Filed: Jul. 7, 1999

(51) Int. Cl.$^7$ .................................................. F16D 31/02
(52) U.S. Cl. .................................................. 60/413; 60/469
(58) Field of Search .............................. 60/413, 418, 469

(56) References Cited

U.S. PATENT DOCUMENTS

| | | | |
|---|---|---|---|
| 5,147,172 | 9/1992 | Hosseini | 414/719 |
| 5,520,499 | 5/1996 | Ufheil et al. | 414/685 |
| 5,706,657 | 1/1998 | Amborski et al. | 60/413 |
| 5,733,095 | 3/1998 | Palmer et al. | 414/685 |

OTHER PUBLICATIONS

Application Serial No. 08/631,698 filed Apr. 12, 1996, entitled "Variable Rate Ride Control System".
Application Serial No. 09/110,493, filed Jul. 6, 1998, entitled "Variable Rate Ride Control".

*Primary Examiner*—Edward K. Look
*Assistant Examiner*—Michael Leslie
(74) *Attorney, Agent, or Firm*—Steven M. Hanley; Haverstock, Garrett & Roberts (57) ABSTRACT

A ride control system adapted for use in a fluid system of a machine to cushion the ride of the machine, the machine having a frame with an actuator arrangement disposed between the frame and a load to raise the load relative to the frame, the actuator arrangement having a raise port and being operative in a raise mode to raise the load to a desired height in response to pressurized fluid being directed to the raise port from a source of the pressurized fluid, the ride control system including an accumulator arrangement and a valve arrangement connected between the accumulator arrangement, the actuator arrangement, and the source of pressurized fluid, and operative to selectively connect the accumulator arrangement to the raise port of the actuator arrangement when in the raise mode while maintaining the load at the desired height.

16 Claims, 6 Drawing Sheets

RIDE CONTROL

TECHNICAL FIELD

This invention relates generally to a ride control system for a machine, and more particularly, to a simple ride control system operable for maintaining a load in a raised position when actuated.

BACKGROUND ART

It is well known that when a machine, such as, for example, a wheel loader, is being driven for a distance with a loaded bucket, there is always the possibility that the machine will be subjected to shocks due to the weight of the loaded bucket reacting to the machine encountering bumps or other obstacles in its pathway. In order to help reduce or eliminate shocks, it is known to use accumulators that are selectively connected to the lift cylinder actuator. These accumulators, when connected to the loaded end of the actuators, serve to absorb the pressure fluctuations in the actuators thus offsetting the changing forces that would otherwise be acting on the various components of the machine. It is these changing forces acting on the machine that produces the shocks. In order to maintain a pre-charge in the accumulator equal to the pressure in the loaded end of the actuator, it is known to connect the accumulator, during normal use, to the loaded end of the lift cylinder actuator. This is normally accomplished by connecting a conduit therebetween. The conduit normally has an orifice therein that is selectively disposed in the conduit when the machine is not operating in the ride control mode. When the ride control system is active, the load supporting end of the cylinder is in free communication with the accumulator in order to absorb the changing forces.

Known systems providing ride control are often complex and give the actuator a spongy feeling. Also, with some of the known systems a slight load drop can occur upon activation of the ride control system.

Accordingly, the present invention is directed to overcoming one or more of the problems as set forth above.

DISCLOSURE OF THE INVENTION

In one aspect of the present invention, a simplified ride control system is provided for use in a fluid system of a machine to cushion the ride of the machine, the machine having a frame with an actuator arrangement disposed between the frame and a load to raise the load relative to the frame, the actuator arrangement having a raise port and being operative in a raise mode to raise the load to a desired height in response to pressurized fluid being directed to the raise port from a source of the pressurized fluid, the ride control system including an accumulator arrangement, and a valve arrangement connected between the accumulator arrangement, the actuator arrangement, and the source of pressurized fluid, and operative to selectively connect the accumulator arrangement to the raise port of the actuator arrangement when in the raise mode while maintaining the load at the desired height. In one preferred aspect of the invention, equalization of pressure in the raise port and accumulator arrangement is maintained prior to activating the ride control.

BEST MODE FOR CARRYING OUT THE INVENTION

Figure 1:
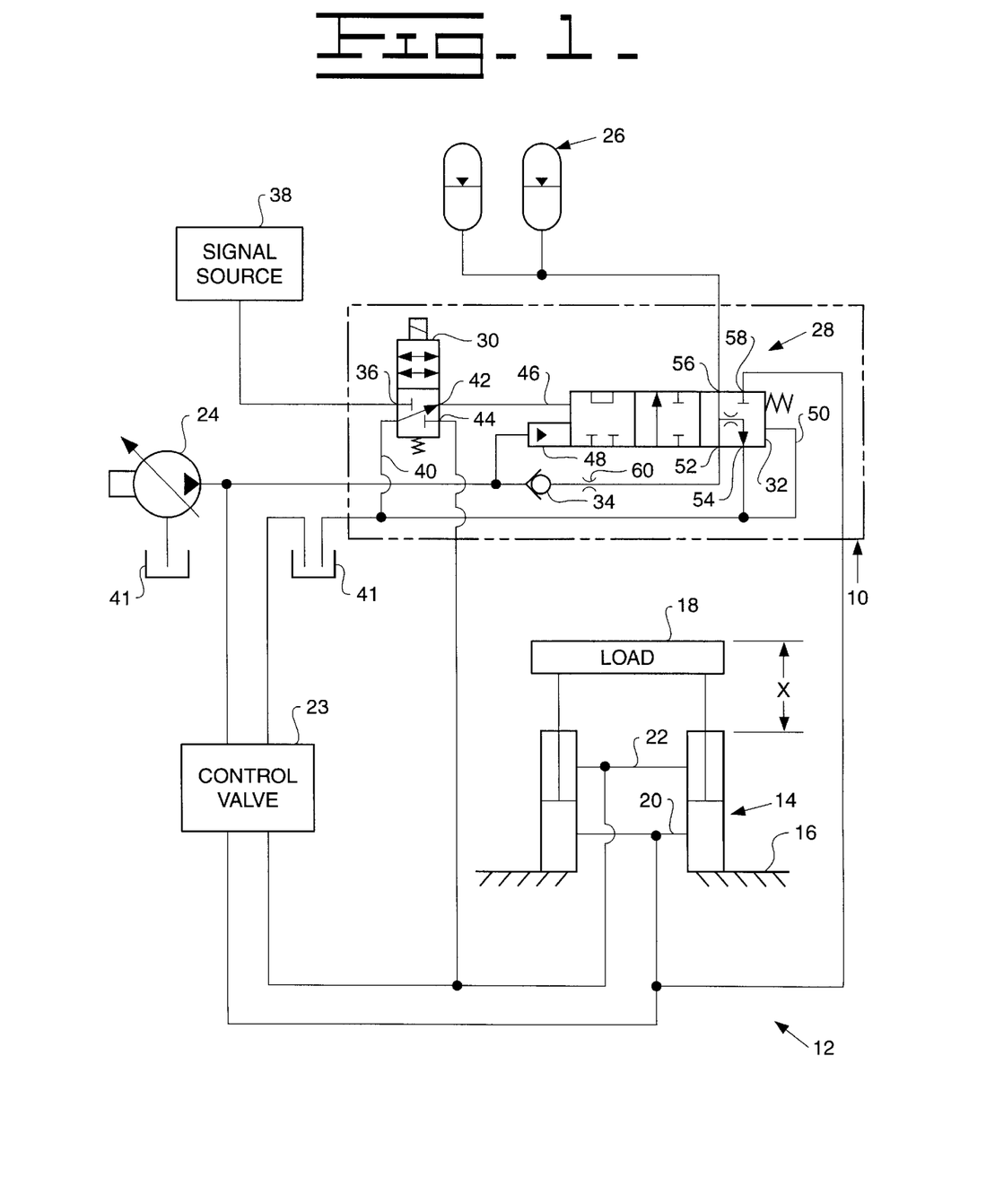
FIG. 1 is a schematic representation of a fluid system of a machine incorporating an embodiment of the subject invention.

Referring to FIG. 1 of the drawings, a ride control system 10 constructed and operable according to the present invention is illustrated in association with a fluid system 12 of a machine (not shown) such as a wheel loader or the like for cushioning the ride of the machine. Fluid system 12 includes an actuator arrangement 14 disposed between a frame 16 of the machine and a load 18 such as a bucket or the like. Actuator arrangement 14 includes a raise port 20 and a lower port 22, and is operable in the conventional manner for raising load 18 to a desired height as denoted by the height X when pressurized fluid is delivered to raise port 20, and to lower load 18 when the pressurized fluid is allowed to pass from raise port 20, both under control of a directional control valve 23. Fluid system 12 includes a pump 24 operable as a source of the pressurized fluid, and an accumulator arrangement 26 which can include any desired number of accumulators such as the two shown, pump 24 and accumulator arrangement 26 being connected to actuator arrangement 14 via ride control system 10.

Ride control system 10 includes a valve arrangement 28 including a four way, two position solenoid actuated valve 30; a four way, three position pilot signal actuated valve 32; and a check valve 34. Solenoid actuated valve 30 has a first port 36 connected to a signal source 38 such as an operator controlled valve or the like, a second port 40 connected to a line to a tank 41, a third port 42 connected with a first pilot port 46 of the three position valve 32, and a fourth port 44 connected to lower port 22 of actuator arrangement 14.

The three position valve 32 includes a second signal port 48 connected to the pump 24 for receiving pressurized fluid therefrom, a third signal port 50 connected to the tank 41, a first port 52 connected to pump 24, a second port 54 connected to the tank 41, a third port 56 connected to the accumulator arrangement 26, and a fourth port 58 connected to raise port 20 of actuator arrangement 14.

In operation, with valves 30 and 32 in the positions shown, with pump 24 in a non-pressurized or by-pass mode, throttled fluid flow is allowed from accumulator arrangement 26 to the tank through ports 56 and 54 of the three position valve 32. When pump 24 upstrokes for delivering pressurized fluid to actuator arrangement 14 via the directional control valve 23 for lifting load 18 to a desired height, such as the height X, the three position valve 32 is moved by the presence of the pressurized fluid in the second signal port 48 to the middle position such that the pressurized fluid is allowed to flow through ports 52 and 56 of the three position valve 32 to accumulator arrangement 26 for charging the accumulator arrangement 26. A check valve 34 prevents back flow toward pump 24 from the accumulator arrangement 26 and a restrictive orifice 60 throttles the flow of pressurized fluid from pump 24 to port 52 of the three position valve 32. Then, when valve 30 shifts to the actuated position or ride control mode, a pilot signal from signal source 38 is allowed to flow through ports 36 and 42 of valve 30 to signal port 46 of the three position valve 32 to move it to the left position. In the left position, valve 32 connects ports 56 and 58 and the port 52 is blocked therefrom. Consequently, the accumulator arrangement 26 is in communication with the actuator arrangement 14 such that the accumulator arrangement 26 provides effective ride control for load 18. Here, because accumulator arrangement 26 is charged by pump 24 prior to the ride control mode being initiated, no drop in load 18 is experienced Referring to FIG. 2, another embodiment 62 of a ride control system according to the present invention is shown in association with fluid system 12. Elements of FIG. 2 corresponding to like elements of FIG. 1 have like element numbers. Ride control system 62 differs from ride control system 10 in the use of a three way, two position solenoid actuated valve 64 having the first port 36 connected to the signal source 38, the second port 40 connected to the tank 41, and the third port 42 connected to the signal port 46 of the three position valve 32. Ride control system 62 additionally includes a two way, two position pilot signal actuated valve 66 a having a signal port 68 connected to third port 42 of the two position valve 64, a first port 70 connected to lower port 22 of actuator arrangement 14, and a second port 72 connected to the tank 41.

Figure 2:
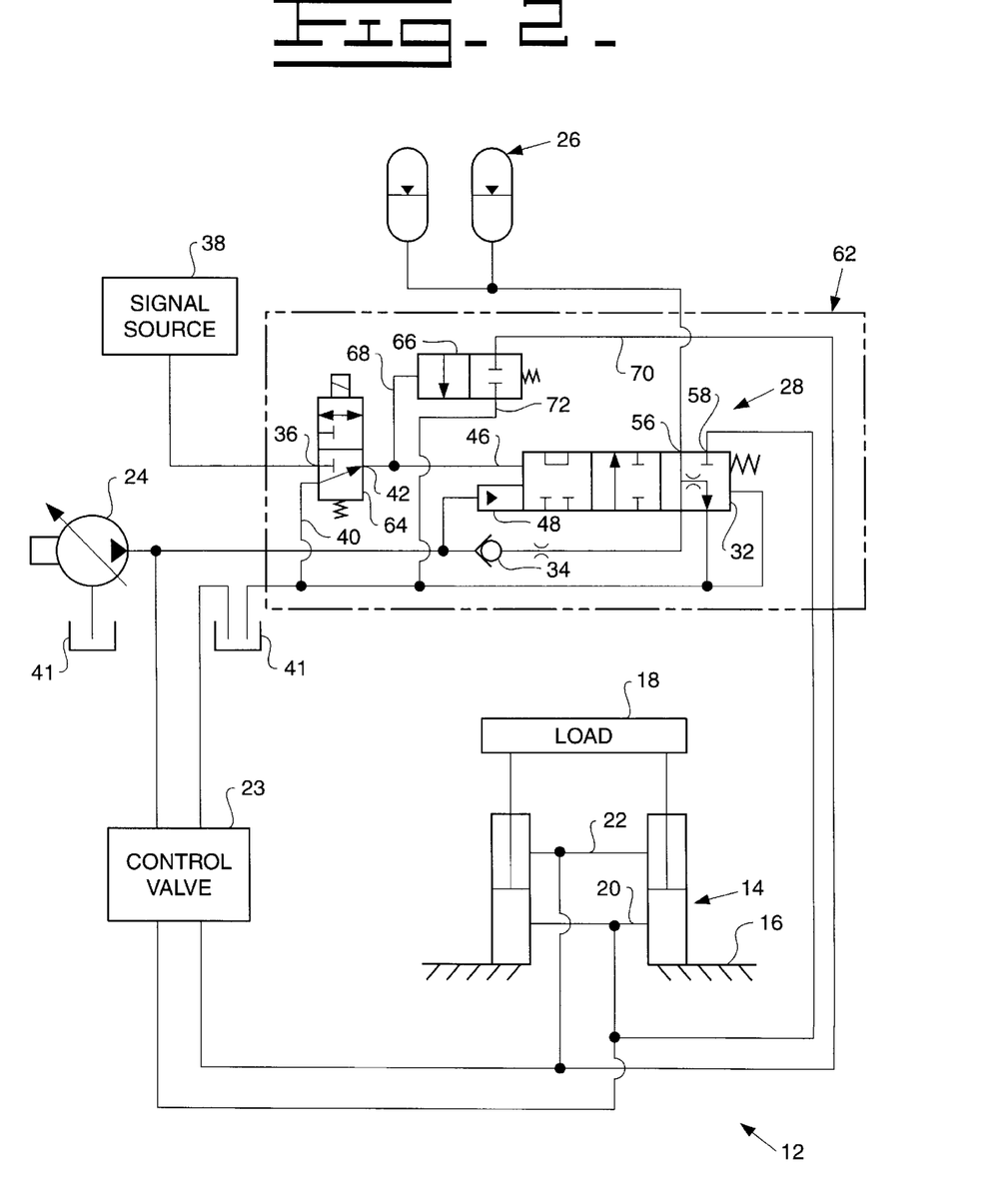
FIG. 2 is a schematic representation of a fluid system of a machine incorporating a modified version of the schematic of FIG. 1.

In operation, when the machine is started, pressurized fluid is directed from the signal source 38 to the port 36 of valve 64. When pump 24 is in a low pressure or by-pass operating mode and the three position valve 32 and the two position valve 64 are in the positions shown, the accumulator arrangement 26 is allowed to drain to the tank 41. When pump 24 up-strokes to lift load 18, the three position valve 32 moves to the middle position in response to the pressurized fluid from the pump 24 such that pump 24 charges accumulator arrangement 26. Then, when valve 64 is moved to the actuated position, the pilot signal communicates with the signal port 46 of the three position valve 32 to move it to the left or ride control position to communicate raise port 20 of actuator arrangement 14 with accumulator arrangement 26. The pilot signal also operates to move the two position valve 66 to the left or flow position such that flow is allowed from lower port 22 of actuator arrangement 14 to the tank 41. This facilitates the free flow of fluid during cushion ride between the tank 41 and the lower port 22 of the actuator arrangement 14.

Figure 3:
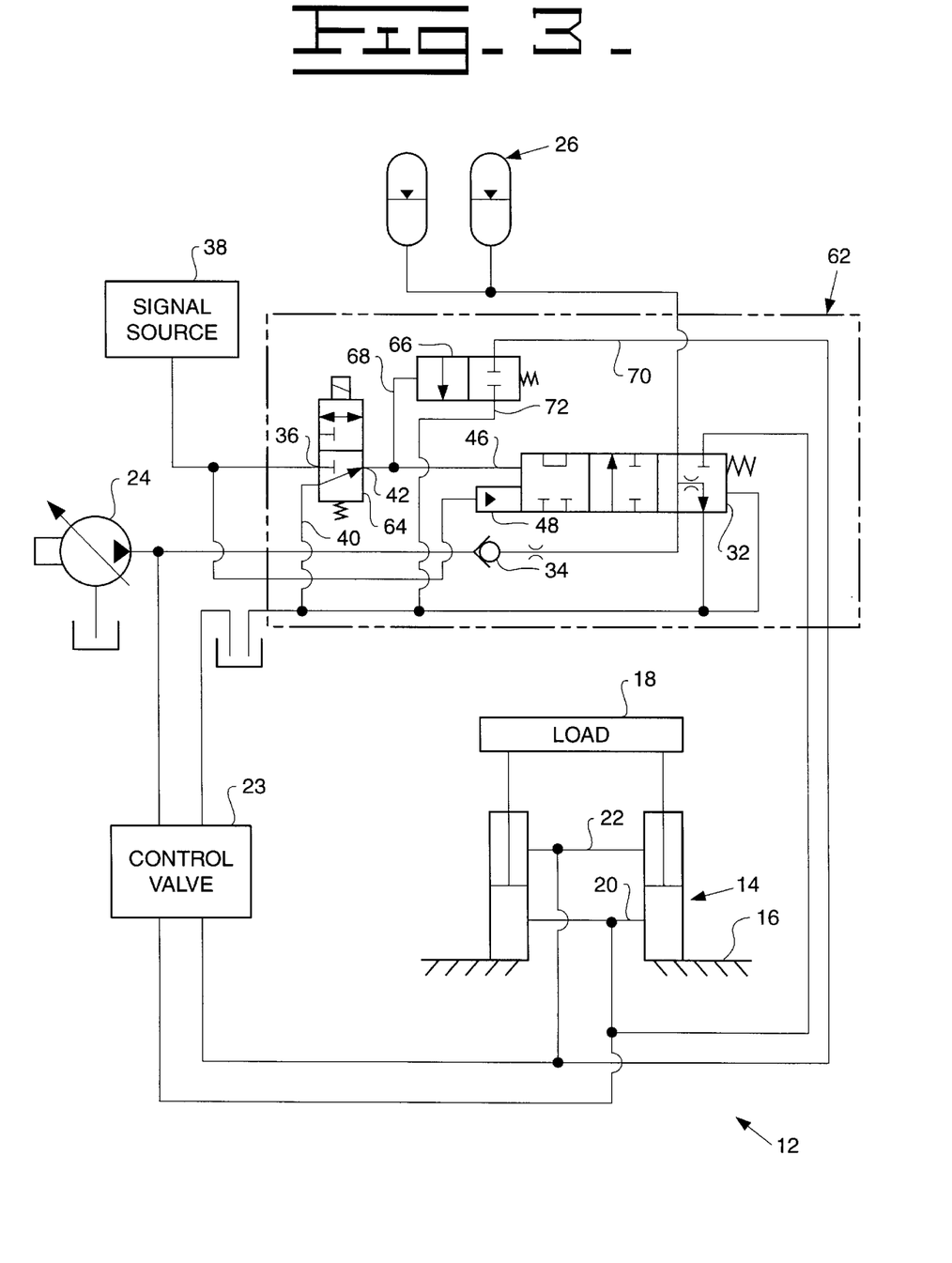
FIG. 3 is a schematic representation of a fluid system of a machine incorporating another modified version of the schematic of FIG. 2.

Referring to FIG. 3, a modification of the embodiment of the ride control system 62 is shown. Elements of FIG. 3 corresponding to like elements of FIG. 2 have like element numbers. The modified ride control system 62 differs from ride control system 62 of FIG. 2 in that the signal port 48 is connected to the signal source 38 instead of the pump 24. Thus, upon startup of the machine, pressurized fluid from the signal source 38 is directed to the three position valve 32 moving it to the middle position. The operation of the modified version of the ride control system 62 functions in the same way as that of FIG. 2.

Figure 4:
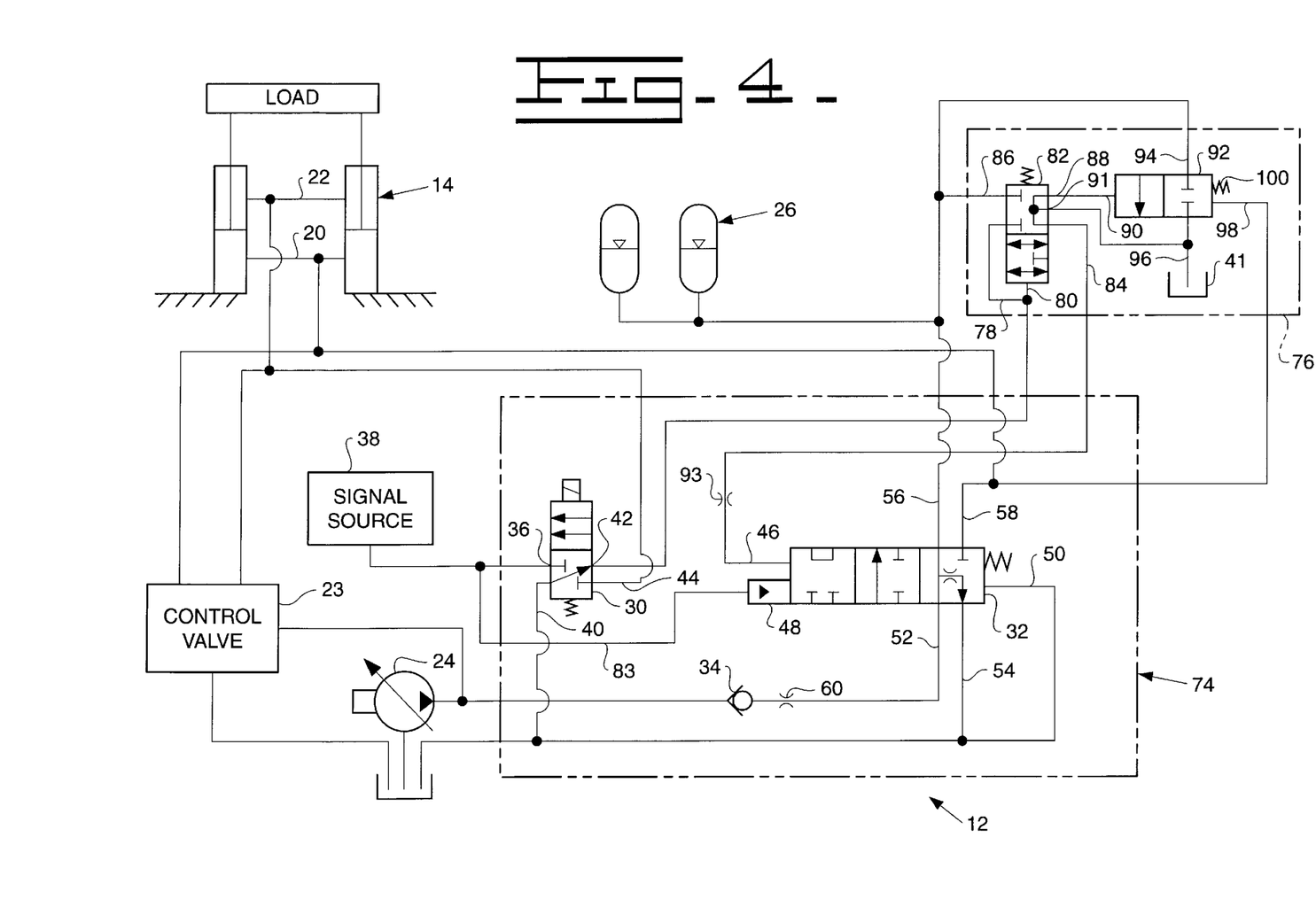
FIG. 4 is a schematic representation of another embodiment of the subject invention.

Turning to FIG. 4, another embodiment of a ride control system 74 according to the present invention is shown including a circuit 76 for equalizing pressure conditions in an accumulator arrangement 26 and a raise port 20 of an actuator arrangement 14 prior to entering the ride control mode. Like elements of the system 74 and systems 10 and 62 being identified by like element numbers. The ride control system 74 includes the solenoid actuated valve 30 having the port 36 connected to the signal source 38, the port 40 connected to the tank 41, the port 44 connected to the lower port 22 of the actuator arrangement 14, and the port 42 connected to a first port 78 and a signal port 80 of an equalizer valve 82 of the circuit 76. The check valve 34 and the restricted orifice 60 are located between the pump 24 and the port 52 of the three position valve 32. The signal port 48 of the three position valve 32 is connected to the signal source 38 by a conduit 83.

The equalizer valve 82 includes a second port 84 connected to the first signal port 46 of the three position valve 32, a third port 86 connected to third port 56 of the three position valve 32, a fourth port 88 connected to a first signal port 90 of a relief valve 92 and a fifth port 91 connected to the tank 41. An orifice 93 is disposed between the second port 84 of the equalizer valve 82 and the first signal port 46 of the three position valve 32. Relief valve 92 includes a port 94 connected to the port 56 of the three position valve 32, accumulator arrangement 26, and the third port 86 of the equalizer valve 82. Relief valve 92 also includes a port 96 connected to tank 41, a second signal port 98 connected to the port 58 of the three position valve 32 and the raise port 20 of actuator arrangement 14, and a small spring 100 to oppose movement to the left position.

When the machine is not running and with the valves 30 and 32 in the positions shown, the accumulator arrangement 26 is allowed to drain to tank 41. When the machine is started, pressurized fluid from the signal source 38 is directed through the conduit 83 to the signal port 48 of the three position valve 32 moving it to its middle position. By upstroking the pump 24, pressurized fluid is directed through the ports 52,56 of the three position valve 32 to charge the accumulator arrangement 26. Then, when the ride control mode is selected by moving valve 30 to the top position, the signal from signal source 38 will be present at signal port 80 and first port 78 of equalizer valve 82. In response to the pressure at the signal port 80, valve 82 moves to the bottom position to allow flow to relief valve 92 thus urging valve 92 to the left position. When in the left position flow from port 94 is free to pass to the tank 41. When the force exerted against the valve 92 by pressure in port 90 exceeds the opposing force exerted by pressure in port 98 (communicating with raise port 20 of actuator arrangement 14) and spring 100, the pressure in the accumulator arrangement 26 is substantially equalized with the pressure in raise port 20. The orifice 93 disposed between the second port 84 of the equalizer valve 82 and the first signal port 46 of the three position valve 32 is sized such that the relief valve 92 will have time to function to equalize pressure between the accumulator arrangement 26 and the actuator raise port 20 before the three position valve 32 shifts to the left position from the pressure of the fluid in the first signal port 46. In other words, the orifice 93 provides a slight time delay in order for pressure equalization to occur. Following the slight time delay, valve 32 will be in the left position so as to communicate the accumulator arrangement 26 with the raise port 20 of the actuator arrangement 14 thus providing ride control as explained above.

Figure 5:
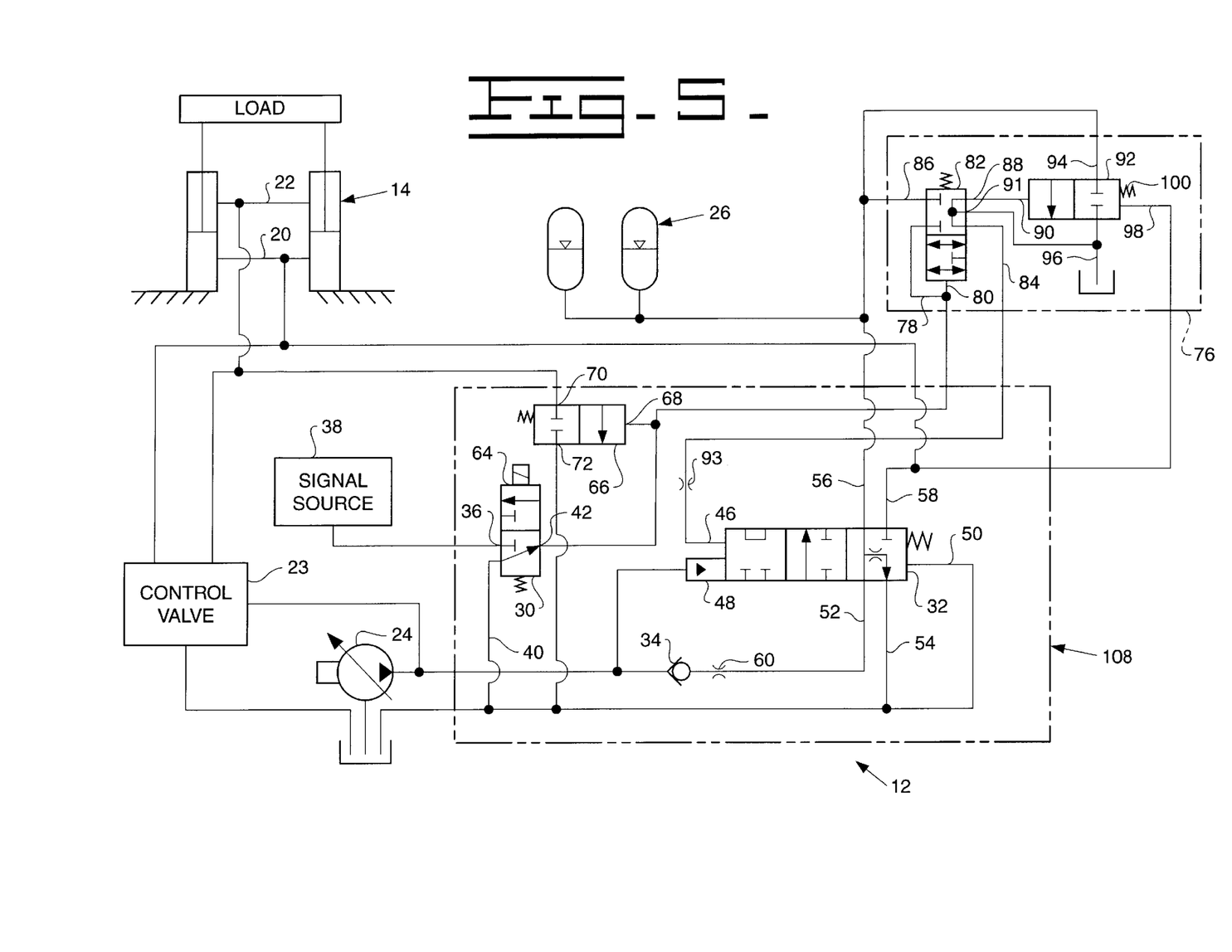
FIG. 5 is a schematic representation of a fluid system of a machine incorporating a modified version of the schematic of FIG. 4.

Referring to FIG. 5, another embodiment 108 of a ride control system according to the present invention is shown in association with fluid system 12. Elements of FIG. 5 corresponding to like elements of FIG. 4 have like element numbers. Ride control system 108 differs from ride control system 74 in the use of the three way, two position solenoid actuated valve 64, set forth in FIG. 2, having the first port 36 connected to the signal source 38, the second port 40 connected to the tank 41, and the third port 42 connected to the ports 78,80 of the pressure equalizing valve 82. The ride control system 108 additionally includes the two way, two position pilot signal actuated valve 66, as set forth in FIG. 2, having a signal port 68 connected to the third port 42 of the two position valve 64, a first port 70 connected to lower port 22 of actuator arrangement 14, and a second port 72 connected to the tank 41. Likewise, the signal port 48 of the three position valve 32 is connected to the pump 24 instead of the signal source 38. All other aspects are the same as that set forth with respect to FIG. 4.

In operation of the embodiment of FIG. 5, when the pump 24 is in the idle or bypass mode of operation and the three position valve 32 and the two position valve 64 are in the positions shown, the accumulator arrangement 26 is allowed to drain to the tank 41. When the pump 24 is up-stroked to lift the load 18, the three position valve 32 moves to the middle position so that the pump 24 charges the accumulator arrangement 26. When the two position valve 64 is actuated to initiate cushion ride, the pilot signal is directed to the pressure equalizer valve 82 moving it to its second position which directs the pressure signal to the signal port 46 of the three position valve 32. As set forth in the operation with respect to FIG. 4, the orifice 109 creates a slight time delay to ensure that the pressure in the raise port 20 is substantially equal to the pressure in the accumulator arrangement 29 prior to the three position valve 32 moving to its leftward position to provide the cushion ride. At the same time, the pilot signal also operates to move the two position valve 66 to the left or flow passing position such that flow is allowed from the lower port 22 of the actuator arrangement 14 to the tank 41. This provides cushioning of the load 18 while in the ride control mode.

Figure 6:
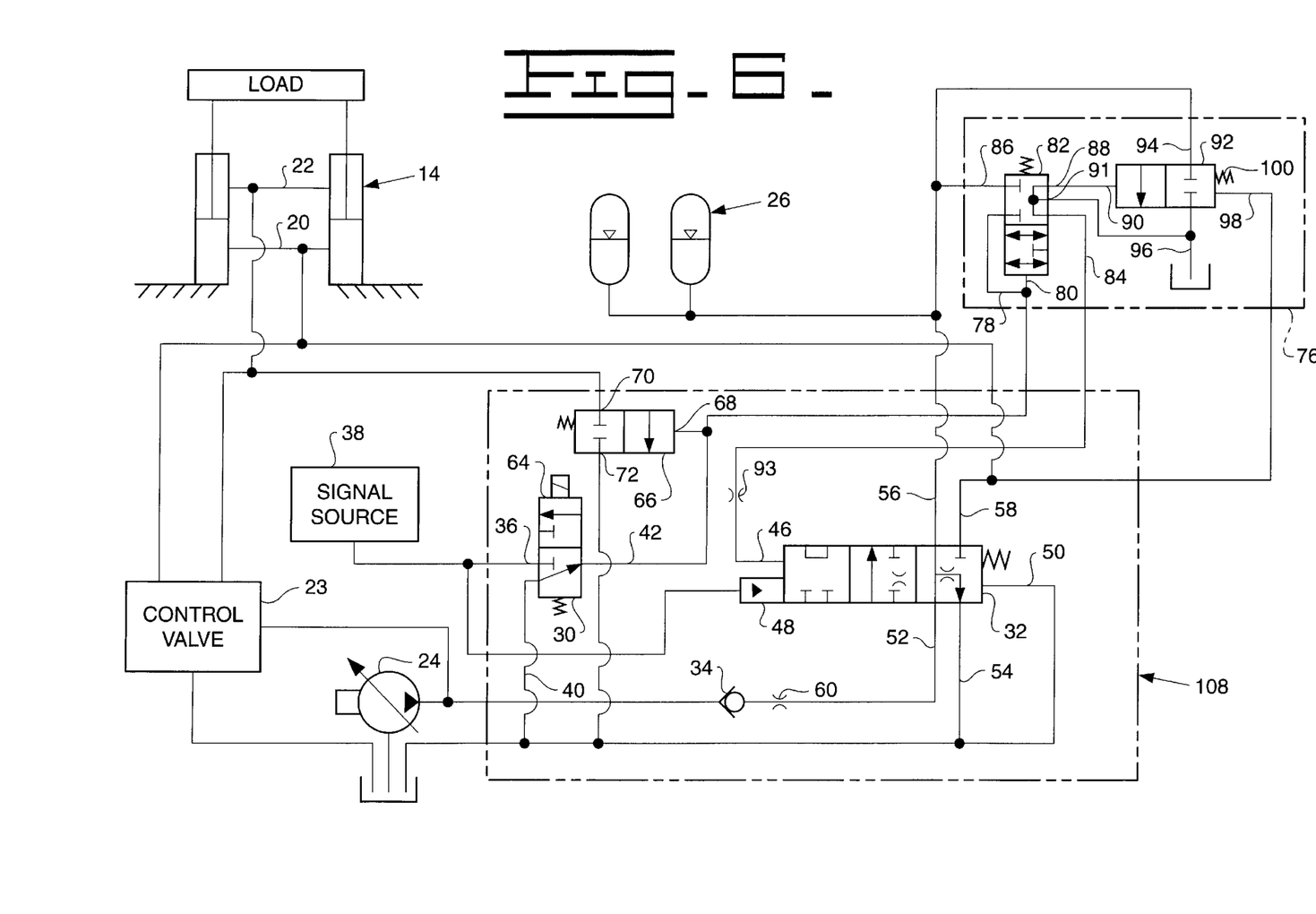
FIG. 6 is a schematic representation of a fluid system of a machine incorporating a modified version of the schematic of FIG. 5.

Turning to FIG. 6, a modification of the embodiment of the ride control system 108 is shown. Elements of FIG. 6 corresponding to like elements of FIG. 5 have like element numbers. The modified ride control system 108 differs from ride control system 74 of FIG. 5 in that the signal port 48 of the three position valve 32 is connected to the signal source 38 instead of the pump 24. All other aspects are the same.

INDUSTRIAL APPLICABILITY

The present ride control system has utility for a wide variety of work machines, such as wheel loaders and the like, wherein maintaining a loaded bucket at an initial height is desired when engaging the ride control mode.

Other aspects, objects and advantages of the present invention can be obtained from a study of the drawings, the disclosure and the appended claims.

What is claimed is:

1. A ride control system adapted for use in a fluid system of a machine to cushion the ride of the machine, the machine having a frame with an actuator arrangement disposed between the frame and a load to raise the load relative to the frame, the actuator arrangement having a raise port and being operative in a raise mode to raise the load to a desired height in response to pressurized fluid being directed to the raise port from a source of the pressurized fluid, the ride control system comprising:

an accumulator arrangement; and a valve arrangement comprising a valve connected between the accumulator arrangement, the actuator arrangement, and the source of pressurized fluid, and operative to selectively connect the accumulator arrangement to the raise port of the actuator arrangement when in the raise mode while maintaining the load at the desired height, wherein the valve being selectively operative to equalize a pressure condition in the accumulator arrangement and a pressure condition in the raise port of the actuator arrangement prior to connection of the accumulator arrangement to the actuator arrangement through the valve.

2. The ride control system of claim 1, further comprising a circuit operable for substantially equalizing pressure conditions in the raise port of the actuator arrangement and in the accumulator arrangement prior to connection of the accumulator arrangement to the raise port.

3. A ride control system including a source of signal pressure and being adapted for use in a fluid system of a machine to cushion the ride of the machine, the machine having a frame with an actuator arrangement disposed between the frame and a load to raise the load relative to the frame, the actuator arrangement having a raise port and being operative in a raise mode to raise the load to a desired height in response to pressurized fluid being directed to the raise port from a source of the pressurized fluid, the ride control system comprising:

an accumulator arrangement; and a valve arrangement connected between the accumulator arrangement, the actuator arrangement, and the source of pressurized fluid, and operative to selectively connect the accumulator arrangement to the raise port of the actuator arrangement when in the raise mode while maintaining the load at the desired height, wherein the valve arrangement is selectively operative to equalize a pressure condition in the accumulator arrangement and a pressure condition in the raise port of the actuator arrangement prior to connecting the accumulator arrangement to the actuator arrangement, wherein the valve arrangement includes a four way, three position valve and a two position valve connected between the source of signal pressure and the three position valve.

4. The ride control system of claim 3, including a second two position valve disposed between the lower port of the actuator arrangement and the tank, the second two position valve being selectively movable in response to pressurized fluid from the signal source.

5. The ride control system of claim 4, wherein the four way, three position valve is a pilot operated valve and is connected between the source of pressurized fluid, the accumulator arrangement and the raise port of the actuator arrangement, and is movable to a ride control position by a pilot signal communicated thereto by the first two position valve to allow flow of the pressurized fluid between the raise port of the actuator arrangement and the accumulator arrangement.

6. The ride control system of claim 5, wherein the valve arrangement also includes a pressure equalizing circuit operative to equalize the pressure between the raise port of the actuator arrangement and the accumulator arrangement prior to connecting the accumulator arrangement with the actuator arrangement.

7. The ride control system of claim 6, wherein the three position valve has an accumulator charging position and the first two position valve is a solenoid operated valve, a second signal source is connected to the three position valve and operative to move the three position valve to the accumulator charging position.

8. The ride control system of claim 5, wherein the first two position valve is a three way, two position valve connected between the signal source and a signal port of the four way, three position valve and is operable to communicate a signal from the signal source to the signal port of the four way, three position valve for moving the four way, three position valve to a ride control mode.

9. The ride control system of claim 8, including a check valve disposed between the source of pressurized fluid and the four way, three position valve for preventing dropping of the load when the four way, three position valve is in the ride control position.

10. The ride control system of claim 5, including a time delay orifice arrangement disposed between the pressure equalization circuit and the three position valve and operative to create a time delay so that pressure equalization occurs between the raise port of the actuator arrangement and the accumulator arrangement prior to the three position valve moving to its ride control position.

11. The ride control system of claim 4, wherein the second two position valve is operable to allow fluid flow from a lower port of the actuator arrangement when the signal is communicated to the signal port of the four way, three position valve.

12. The ride control system of claim 3 wherein the three position valve has an accumulator charging position and a second signal source is connected to the three position valve and operative to move the three position valve to the accumulator charging position.

13. The ride control system of claim 12 wherein the second signal source is the source of pressurized fluid.

14. The ride control system of claim 12 wherein the second signal source is the source of signal pressure.

15. A ride control system adapted for use in a fluid system of a machine to cushion the ride of the machine, the machine having a frame with an actuator arrangement disposed between the frame and a load to raise the load relative to the frame, the actuator arrangement having a raise port and being operative in a raise mode to raise the load to a desired height in response to pressurized fluid being directed to the raise port from a source of the pressurized fluid, the ride control system comprising:

an accumulator arrangement; and a valve arrangement connected between the accumulator arrangement, the actuator arrangement, and the source of pressurized fluid, and operative to selectively connect the accumulator arrangement to the raise port of the actuator arrangement when in the raise mode while maintaining the load at the desired height, wherein the valve arrangement includes a three position valve connected to the source of pressurized fluid, the accumulator arrangement and the raise port of the actuator arrangement, and a first two position valve operable for moving the three position valve to a position to allow communication between the raise port and the accumulator arrangement, and to allow communication between a lower port of the actuator arrangement and a tank.

16. The ride control system of claim 15, wherein the valve arrangement includes a check valve disposed between the three position valve and the source of pressurized fluid for preventing fluid flow from the three position valve to the source of pressurized fluid.

* * * * *